April 5, 1949.  R. S. JENKINS  2,466,432
METHOD OF MAKING A COMMUTATOR
Original Filed Oct. 11, 1946

Inventor:
Robert S. Jenkins,
by  *Prowell S. Mack*
His Attorney.

Patented Apr. 5, 1949

2,466,432

UNITED STATES PATENT OFFICE 2,466,432

METHOD OF MAKING A COMMUTATOR

Robert S. Jenkins, Lansing, Mich., assignor to General Electric Company, a corporation of New York Original application October 11, 1946, Serial No. 702,705. Divided and this application January 22, 1948, Serial No. 3,800

2 Claims. (Cl. 29—155.54)

My invention relates to an improved method of making commutators for dynamoelectric machines.

An object of my invention is to provide an improved method of making a commutator.

Further objects and advantages of my invention will become apparent and my invention will be better understood from the following description referring to the accompanying drawing, and the features of novelty which characterize my invention will be pointed out with particularity in the claims annexed to and forming part of this specification.

This application is a division of my application Serial No. 702,705, filed October 11, 1946, and assigned to the assignee of the present application.

Figure 1:
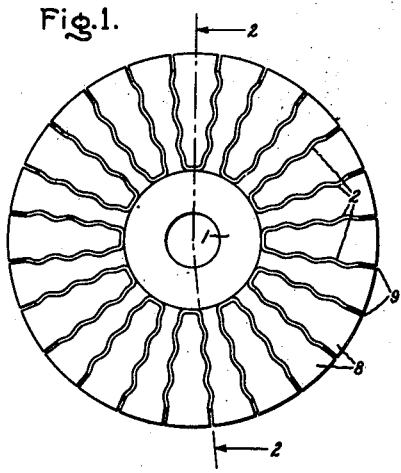
Figure 2:
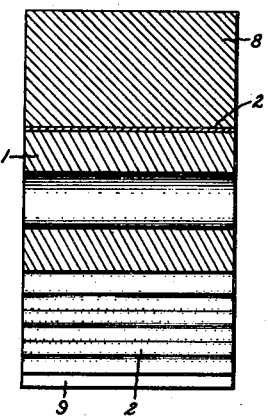
Figure 3:
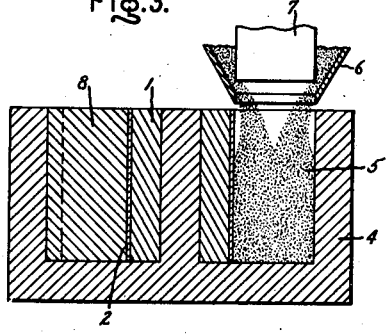
Figure 4:
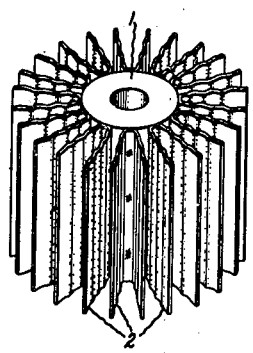

In the drawing, Fig. 1 is an end elevational view of a commutator including an embodiment of my invention; Fig. 2 is a sectional view taken along line 2—2 of Fig. 1; Fig. 3 illustrates a step in the method of making my improved commutator; Fig. 4 is a perspective view of an assembled hub and separators used in making my improved commutator prior to the formation of commutator segments between the separators thereof; and Fig. 5 is a plan view partly broken away of the arrangement shown in Fig. 3.

Referring to the drawing, I have illustrated one embodiment and a method of making this embodiment of my invention in which I form a commutator provided with a hub and separators for the commutator segments, all of which are formed of electrically conductive material and in which the commutator segments are insulated from the supporting hub and separators by a suitable insulation, such as a fused vitreous enamel insulation coating applied over the surfaces of the segment supporting and separating structure. In making such a commutator, a substantially cylindrical metal hub 1 of steel or other suitable material adapted for mounting on a supporting shaft is provided and a plurality of outwardly extending separators is secured to the outer cylindrical surface of the hub 1. These separators may be formed as shown in the drawing comprising substantially U-section irregular or corrugated separator units 2 which are secured to the supporting hub 1 by the bases thereof arranged in contact with the outer surface of the hub 1 and secured by spot welding, brazing, or other suitable fused connection between the base of the separator and the hub 1 or by any other suitable means, as by bolts, screws, or rivets. This provides a construction as shown in Fig. 4 in which a plurality of outwardly extending irregular separators extend substantially radially outwardly from the central hub member 1. If desired, each of these separators can be made as an individual unit individually secured to the hub; however, this would be a more expensive and complicated arrangement than that shown in Fig. 4. This assembly of hub and separators then is completely insulated by the application of a coating of suitable insulating material, such as a fused vitreous enamel insulation over the exposed surfaces of the separators 2 and of the exposed peripheral surfaces of the hub 1. It is extremely important that this insulation coating be applied over all of these surfaces and that no surface of the electrically conductive separators or hubs remain exposed, as such an uncovered portion of either of these members would form a ground or short circuit for a commutator segment in contact therewith.

Figure 5:
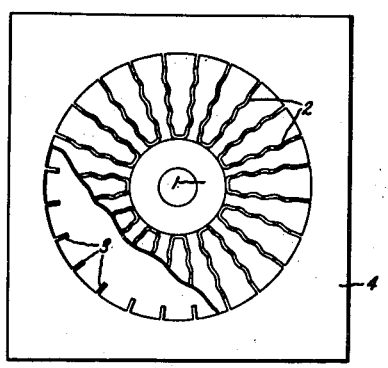

After the assembly of separators and hub has been completed, this assembly is arranged in a mold as shown in Figs. 3 and 5 with the separators 2 arranged in the mold in alignment with inwardly extending projections 3 formed on the inner surface of a mold 4, after which commutator segments of suitable electrically conductive material are molded between all of the separator members 2. In Fig. 3, I have shown one step in the method of molding such commutator segments which includes the provision of intimately molded powdered electrically conductive material 5 supplied between the separator members 2 by any suitable means, as through a supply nozzle 6 and a supply regulating valve 7, such that the powdered electrically conductive material is arranged in intimate engagement with the insulation on the separator members 2 and is thoroughly compacted therebetween and between the mold projections 3 and the outer surface of the mold. When all of the spaces between the separator members 3 have been filled with electrically conductive material, the mold 4 with the commutator members thus assembled therein is placed in a suitable furnace, and the temperature is raised and held at such a value as to sinter the molded powdered electrically conductive material 5 to form substantially solid commutator segments thereof. After this sintering operation, the completed commutator is allowed to cool as desired, and the assembled commutator segments, separators, and hub are removed from the mold 4 and form a commutator as shown in Figs. 1 and 2. In such a commutator, the segments are formed as solid members 8 insulated from each other and from their supporting structure by the insulation on this structure and by air gaps 9 between radially outwardly extending portions at the ends of the commutator segments of a predetermined desired length which have been formed by the mold projections 3 during the molding and sintering process. This provides a completed commutator with an undercut separator arrangement between the outer ends of the commutator segments to provide for a predetermined amount of wear of the commutator segments before it is necessary to make any repairs thereto.

The irregular separators 2 preferably are formed as shown in the illustration with the corrugations or irregular ribs thereon extending axially of these separator members, as this provides for a secure anchoring of the commutator segments to the hub member, but this irregular surface could take any desired shape which would provide suitable anchoring for the molded commutator segments to the supporting hub. Furthermore, any suitable molding operation for the formation of the commutator segments could be utilized where a suitable insulation is provided over the separators and the exposed surfaces of the supporting hub which would not be destroyed during the molding operation. A fused vitreous enamel would be suitable for this purpose as the melting temperature thereof would be considerably higher than the molding and sintering temperatures of the commutator segments if these were to be made of copper or similar electrically conductive material.

While I have illustrated and described a particular method of my invention, modifications thereof will occur to those skilled in the art. I desire it to be understood, therefore, that my invention is not to be limited to the particular method disclosed, and I intend in the appended claims to cover all modifications which do not depart from the spirit and scope of my invention.

What I claim as new and desire to secure by Letters Patent of the United States is:

1. A method of making a commutator comprising forming a supporting hub, securing a plurality of outwardly extending separators having irregular surfaces to the outer periphery of the hub, coating the exposed surfaces of the separators and the exposed peripheral surfaces of the hub with insulation, arranging the assembled hub and separators in a mold with the separators arranged in alignment with inwardly extending projections on the mold, molding powdered electrically conductive material between adjacent sides of the separators and the mold projections, sintering the molded powdered material to form substantially solid commutator segments thereof, and removing the assembled commutator from the mold.

2. A method of making a commutator comprising forming a substantially cylindrical metal supporting hub, securing a plurality of substantially U-section corrugated metal separators by fusing the bases thereof to the outer periphery of the hub, coating the exposed surfaces of the separators and the exposed peripheral surfaces of the hub with a fused vitreous enamel insulation, arranging the assembled hub and separators in a mold with the separators arranged in alignment with inwardly extending projections on the mold, molding powdered electrically conductive material between adjacent sides of the separators and the mold projections in intimate engagement with the enamel insulation, sintering the molded powdered material to form substantially solid commutator segments thereof, and removing the assembled commutator from the mold.

ROBERT S. JENKINS.

REFERENCES CITED

The following references are of record in the file of this patent:

UNITED STATES PATENTS

| Number | Name | Date |
|---|---|---|
| 2,387,073 | Horlacher | Oct. 16, 1945 |